United States Patent [19]
Takai et al.

[11] Patent Number: 4,525,756
[45] Date of Patent: Jun. 25, 1985

[54] HEAD SHIFT MECHANISM

[75] Inventors: Kazuki Takai; Mitsuhiro Hakumoto; Yasuo Yamada, all of Tokyo, Japan

[73] Assignee: Clarion Co., Ltd., Japan

[21] Appl. No.: 400,721

[22] Filed: Jul. 22, 1982

[30] Foreign Application Priority Data

| Jul. 24, 1981 | [JP] | Japan | 56-109352[U] |
| Jul. 25, 1981 | [JP] | Japan | 56-110473[U] |
| Jul. 25, 1981 | [JP] | Japan | 56-110474[U] |

[51] Int. Cl.$^3$ .............................................. G11B 21/02
[52] U.S. Cl. ........................................ 360/75; 360/105
[58] Field of Search ................... 360/75, 106, 77, 78, 360/74.1, 74.2, 105; 361/24, 28, 29, 70, 94, 150, 153, 154, 179

[56] References Cited

U.S. PATENT DOCUMENTS

| 4,037,261 | 7/1977 | Shin et al. | 360/106 X |
| 4,215,378 | 7/1980 | Sato et al. | 360/74.2 X |
| 4,216,507 | 8/1980 | Flygstad et al. | 360/106 X |
| 4,250,527 | 2/1981 | Broghammer | 360/75 |
| 4,342,055 | 7/1982 | Osanai | 360/74.2 |

FOREIGN PATENT DOCUMENTS 2020471 11/1979 United Kingdom ............... 360/74.2

Primary Examiner—Bernard Konick
Assistant Examiner—Steven R. Garland
Attorney, Agent, or Firm—Russell E. Hattis; Ralph R. Rath

[57] ABSTRACT

In a head shift mechanism in a tape player to shift a head to a reproducing position and hold it there by means of a solenoid driven by a driving signal from a solenoid driving device, an improvement comprising a solenoid driving signal generator, a counter connected to the solenoid driving signal generator for counting up solenoid driving signals from the solenoid driving signal generator, and a head shift stopping device connected to the counter for receiving count completion signal from the counter to actuate to stop action of the head shift solenoid.

3 Claims, 3 Drawing Figures

HEAD SHIFT MECHANISM

DESCRIPTION

Technical Field

This invention relates to a tape playback head shift mechanism in a tape player so arranged to repeatedly drive a solenoid for shifting a head when the head cannot be held in a reproducing position, and more particularly to a mechanism improved to automatically stop energizing a solenoid when the solenoid cannot achieve head shifting action after a given number of attempts thereat have been made.

Description of the Prior Art

In a tape player having means for shifting a tape recording or playback head from its rest position to its reproducing position by means of a solenoid, the head cannot be held in the reproducing position when a device for holding the head there is out of order. In this connection, the solenoid for shifting the head has conventionally been operated by detecting means responsive to the condition when the tape player is not set in the reproduction mod, i.e., when the head is not held in the reproducing position. The detecting means may be a tape end detector for detecting when rotation of a reel base, etc. stops, and by applying solenoid energizing signals to the solenoid energizing circuit under such circumstances until the head is in such position.

However, according to such conventional mechanism, under these circumstances the tape end detecting means repeatedly outputs the signal until the head is so shifted and held at the reproducing position, unless ejecting operation is performed or power source is cut off. Therefore, the solenoid is continuously provided with electric current for a long time, and is often damaged due to overheating.

Object of the Invention

Accordingly, the present invention has its object in overcoming the above-mentioned drawbacks in the prior art, by providing a tape playback head shift mechanism capable of preventing damages of the solenoid due to overheating thereof by stopping the energization of the solenoid when it is not possible to set the head to its reproducing position after a given predetermined time.

Summary of the Invention

In accordance with the present invention, there is provided a tape playback head shift mechanism in a tape player which comprises:

solenoid means for shifting the head into a reproducing position when energized;

solenoid energizing signal generating means for supplying said solenoid means with energizing signal;

head shift stopping means for preventing the feeding of said energizing signal to said solenoid means;

head shift detecting means for detecting the arrival of said head at said position and for actuating said solenoid driving signal generating means when the head does not reach said position; and counting means for counting the duration of said signal applied to said solenoid means and actuating said shift stopping means when the head does not reach said position in a predetermined time.

DETAILED DESCRIPTION OF THE PREFERRED EMBODIMENTS

Figure 1:
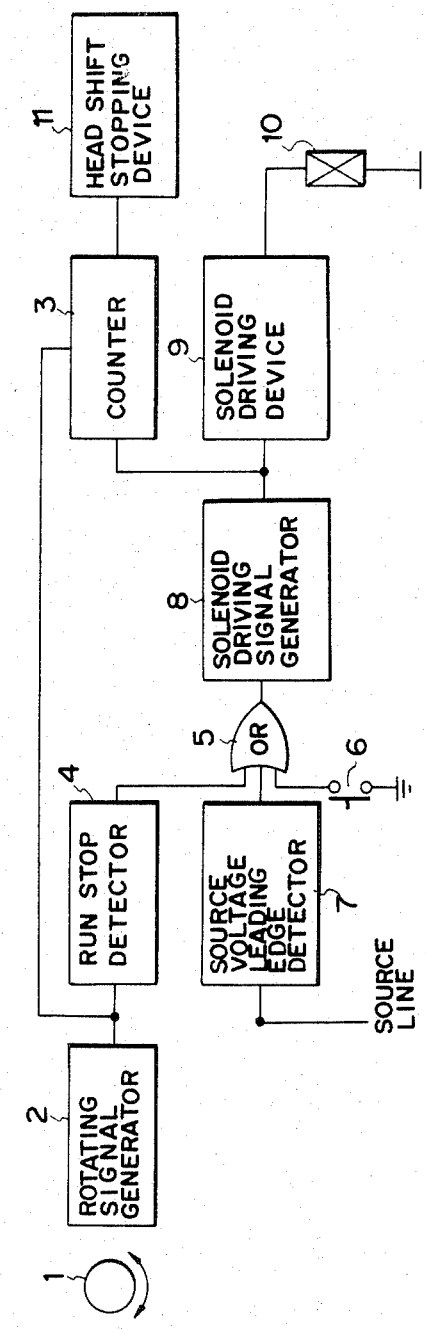
FIG. 1 is a block diagram showing an embodiment of the head shifting mechanism according to the present invention.

The present invention will now be described in detail by way of preferred embodiments referring for the accompanying drawings.

A rotating signal generator 2 provided near a real base 1 of a tape player comprises a Hall device IC, a lead switch, etc. and means for generating a pulsating signal corresponding to rotation of the reel base 1. The rotating signal generator 2 is connected to the reset input of a counter 3 and to a run stop detector 4.

The run stop detector 4 senses when judges that the tape has stopped as determined by the absence of a signal from the rotating signal generator 2 for a given time where upon it applies an output signal to a logial OR circuit 5. The logical Or circuit 5 is connected to a changeover switch 6 and a source voltage leading edge detector 7. The detector 7 is connected to a source line to detect rise of the source voltage when source power is supplied to the tape player and to generate a signal accordingly. The logic OR circuit 5 is connected to a solenoid driving signal generator 8. The solenoid driving signal generator 8 is connected to a solenoid driving device 9 In turn connected to a solenoid 10 energized by the solenoid driving device 9. The solenoid 10 is arranged when energized to change over the tape channel detected by the head when the head is at the reproducing position, and to shift the head into such a position when the head is not at the reproducing position.

To the count input of counter 3 is connected the solenoid driving signal generator 8. The counter 3 counts duration of the signal outputted from the solenoid driving signal generator 8 until a given pulse count is to registered and thereby outputs a count completion signal to a head shift stopping device 11 when such count is reached. At the same time, the counter 3 is reset. Beside this, the counter 3 also is reset when a reset signal is outputted from the rotating signal generator 2 indicating that the reel base 1 has stopped rotating. The head shift stopping device 11 is a driving means for driving an eject mechanism for pushing out a cassette pack from a tape player when the tape player is of an automatically ejecting type and it is a power interrupting means or control means for controlling stop operation of the mechanism, etc.

The mechanism of FIG. 1 so arranged as above functions as will be described hereunder.

When voltage of the source line of the mechanism rises due to supply of power source to the mechanism or due to insertion of the cassette, the source voltage leading edge detector 7 detects the power signal rise and generates a signal to actuate the solenoid driving signal generator 8 through the logical OR circuit 5. The solenoid driving signal generator 8 accordingly outputs a signal to the counter 3 and to the solenoid driving device 9 to thereby energize the solenoid 10. In this case, since the tape player has been in rest condition and the head is not in the reproducing position, the solenoid is energized to function as a head shifting means as described. Accordingly, the head is brought to the reproducing position and if the tape driving system is set for a reproduction mode, the tape runs and the reel base 1 rotates, whereby the counter 3 is reset by the signal from the rotating signal generator 2.

When the head is not set at the reproducing position, and the tape driving system is not set for a reproduction mode, the reel base 1 does not rotate. In this case, the run stop detector 4 detects that the reel base does not rotate and applied a signal to the solenoid driving signal generator 8 through the OR circuit 5 to cause the solenoid driving signal generator 8 to send signal again to the counter 3 and to the solenoid driving device 9 to energize the head shift solenoid 10 again. If the head is still out of the reproducing position, said action is repeated. The duration of this signal is counted by the counter 3 and when counting up to a predetermined number, the counter 3 applied the count completion signal to the head shift stopping device 11. With this signal, the head shift stopping device 11 causes automatic ejecting operation when the mechanism is of an auto-ejecting type to push out the cassette pack and to otherwise stop operation of the tape player including de-energizing the solenoid 10. It also stops energization of the solenoid 10 when the mechanism is not of an auto-eject type. Further, when the mechanism is of an auto-eject type, the solenoid 10 functions as an auto-eject device and as a channel changing device.

Figure 2:
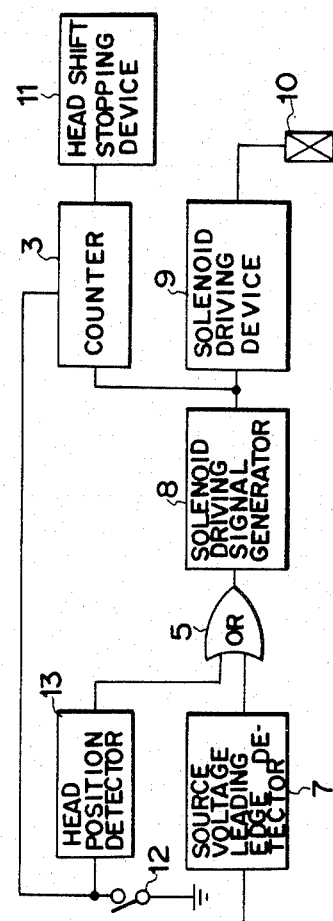
FIGS. 2 and 3 are block diagrams showing further embodiments according to the present invention.

FIG. 2 shows another embodiment according to the present invention in which there is provided a detecting means for ascertaining that the head has advanced up to the reproducing position, whereby it is possible to prevent, with a simpler circuit arrangement, overdrive of the solenoid on occurrence of abnormality of the head shifting mechanism or of a mechanism for holding the head at the reproducing position.

In FIG. 2, a head position detecting switch 12 is provided to be closed when the head is in the reproducing position. The head position detecting switch 12 is connected to a head position detector 13 and to reset input of the counter 3 for sending a detecting signal to the head position detector 13 and a reset signal to the counter 3, respectively. The head position detector 13 generates outputs at a given interval when the head position detecting switch 12 is open, namely, when the head is not at the reproducing position. The output terminal of the head position detector 13 is connected to one input terminal of the OR circuit 5. To the other input terminal of the OR circuit 5 is connected the output terminal of the source voltage leading edge detector 7 which detects the leading edge of voltage of the power source line by generating an output at that time. The output terminal of the OR circuit 5 is coupled to the solenoid driving signal generator 8 which receives a signal from the head position detector 13 or the leading edge detector 7 and generates a signal suitable for energizing the solenoid. An output terminal of the solenoid driving signal generator 8 is connected to the solenoid driving device 9 and to the counter 3.

The counter 3 counts up signals outputted by the solenoid driving signal generator 8 and applied a count completion signal to the head shift stopping device 11 when a given count is reached.

The head shifting mechanism of FIG. 2 functions as will be described hereunder.

When voltage of the source line rises in response to supply of source power to the tape player mechanism or insertion of a cassette, the source voltage leading edge detector 7 generates an output to drive the solenoid driving signal generator 8. Accordingly, the solenoid driving signal generator 8 operates the driving solenoid device 9 to energize the head shift solenoid 10 and applies signals to be counted to the counter 3. At that time, if the head is properly held at the reproducing position, the head position detecting switch 12 is closed, thereby stopping output from the head position detector 13 and resetting the counter 3 at its original state. On the other hand, if the head is not held at the reproducing position, the head position detecting switch 12 is closed, thereby stopping output from the head position detector 13 and resetting the counter 3 at its original state. On the other hand, if the head is not held at the reproducing position, the head position detecting switch 12 is kep open. Accordingly, the head position detector 13 generates outputs at a given interval to actuate the solenoid driving signal generator 8. The signal generator 8 in turn generates output to operate the device 9 and energize the head shift solenoid 10 and to operate the counter 3. If the head remains at a non-reproducing position, said action is repeated and the respective outputs from the solenoid driving signal generator 8 are counted up until a given count is reached. Then, the counter 3 generators a count completion signal and sends it to the head shift stopping device 11 to have it perform automatic ejection of the cassette when the tape player is of an auto-eject type, and perform other control functions, such as interruption of operations of the mechanism when the tape player is not of an auto-eject type. It goes without saying that interval of outputs from the head position detector 13 should be longer than operating time of the head shift solenoid 10 driven through the solenoid driving device 9.

As described in the above, the head shift mechanism according to the present invention makes it possible to automatically stop energizing a solenoid when the head is not held at reproducing position even after the solenoid is continuously energized a given time. Therefore, it is possible to keep the solenoid from damage due to overheating.

In a tape player in which one solenoid is commonly used to shift the head and to change tape feeding direction or automatically eject a tape when the tape comes to the end, the solenoid is operated to change the tape feeding direction by detecting a stop mode of the tape by a tape end detecting circuit. Therefore, the present invention is also effective because energizing of the solenoid is stopped after a given time when the tape feeding direction cannot be changed due to some misoperation of the tape feed direction changing means at the time of tape end.

Figure 3:
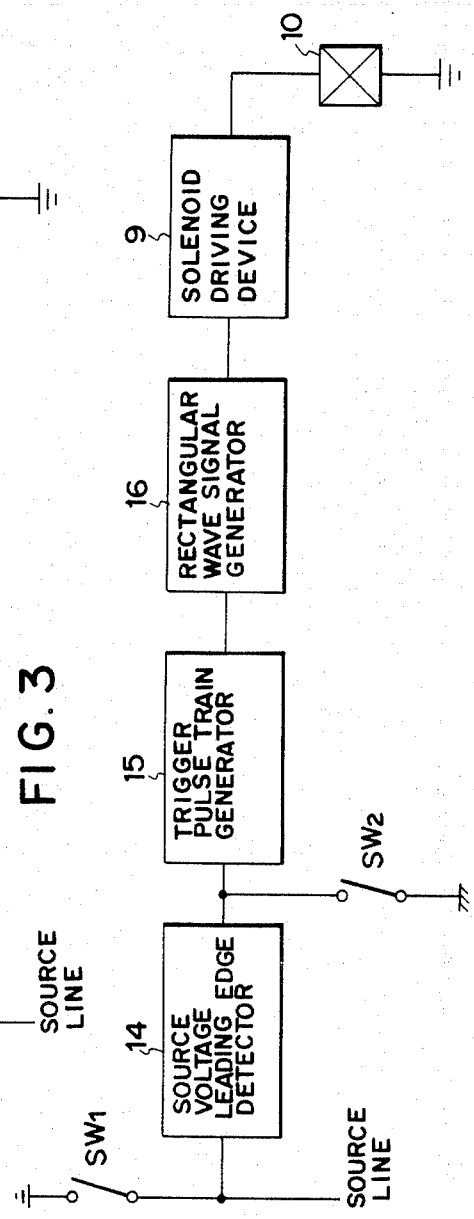

FIG. 3 shows a further embodiment of the head shift mechanism according to the present invention in which a detector for ascertaining that the head has advance is provided. It should be noted here that the counter 3, head shift stopping device 11, etc. are omitted in FIG. 3.

In this Figure, a tape pack detecting switch $SW_1$ is provided on the source line of the tape player. This switch $SW_1$ closes when a cassette pack is inserted in the tape player. A source voltage detector 14 is connected to the pack detecting switch $SW_1$. The source voltage detector 14 comprises a switching circuit, a relay, etc. for observing voltage of the source line and generating an output when the voltage becomes larger than a given value. The source voltage detector 14 is connected a trigger pulse train generator 15. The trigger pulse train generator 15 comprises a multivibrator and a differentiating circuit, for example, and continues generating pulses at a given interval as long as the source voltage detector 14 generates outputs. To the output of the source voltage detector 14 is connected a head position detecting switch SW$_2$ one end of which is grounded. The head position detecting switch SW$_2$ is closed when the head is held at the reproducing position.

A rectangular wave signal generator 16 is connected to the trigger pulse train generator 15. This generator 16 consists of a circuit like a mono-stable multivibrator or the like and send a predetermined rectangular wave to the solenoid driving device 9 when the trigger pulse train generator 15 applied pulses to it. The solenoid driving device 9 connected to the rectangular wave genearator 16 receives its input signal therefrom to energize the head shift solenoid 10, thereby shifting the head to the reproducing position.

The head shift mechanism so arranged as FIG. 3 functions as will be described hereunder.

When a cassette pack is inserted in the tape player which is already in the on-state to close the tape pack detecting switch SW$_1$, or otherwise, when power is supplied to the tape player in which a tape cassette is already inserted, as the voltage of the source line rises, the source voltage leading edge detector 14 generates an output. In this state, since the head is not at the reproducing position, the head position detecting switch SW$_2$ is in an open condition. Accordingly, output from the trigger pulse train generator 15. This generator 15 is turn sends pulses at a given interval to the rectangular wave signal generator 16. The rectangular wave signal generator 16 as it receives the pulses supplied the solenoid driving device 9 with suitable rectangular wave signal to actuate the solenoid driving device 9. Thereby, the head shift solenoid 10 is energized to shift the head to the reproducing position. If the head is smoothly brought to the reproducing position, the head position detecting switch SW$_2$ is closed. The output from the source voltage leading edge detector 14 is then grounded so that the detector output is not applied to the trigger pulse train generator 15. As the result, the trigger pulse train generator 15 does not generate pulses anymore.

On the other hand, if the head is not held at the reproducing position even by the action of the head shift solenoid 10, the head position detecting switch SW$_2$ is open. Accordingly, outputs from the source voltage leading edge detector 14 are still supplied to the trigger pulse train generator 15 permitting this generator 15 to generate the succeeding pulses. Such operation of the mechanism is repeated if the head is not brought to the reproducing position. In this case, the interval of the pulses from the trigger pulse train generator 15 should be larger than the time since connection of cam mechanism and the head by action of the head shift solenoid 10 until arrival of the head at the reproducing position in response to the action of the cam mechanism. It is because if the interval is smaller, the next pulse is generated before the head reaches the reproducing position, thereby re-driving the head shift solenoid.

As described in the above, the head shift mechanism of FIG. 3 is so arranged to detect the position of the head by the head position detecting switch SW$_1$ to thereby immediately actuate the head shift solenoid 10. Therefore, as compared with conventional mechanisms so arranged to energize the solenoid, by detecting the position of the head and utilizing a signal from a tape end detector, the position of the head is immediately detected, so that the head shift solenoid can be re-driven sooner. Further, as compared with conventional mechanism which detect the position of the head by way of the tape end detector, the circuit arrangement of the mechanism according to the present invention is much simpler and number of parts in the whole mechanism is largely reduced. It should be noted here that in the mechanism of FIG. 3 overdrive of the solenoid is prevented in the same manner as those of FIGS. 1 and 2.

The head shift mechanism might fail to start its action even if it is driven once because of too heavy a lod due to lower temperatures, for example. In this case, when re-driven several times, the solenoid can sometimes start to move. Further, there is a possibility that even when the head shift mechanism starts to actuate, it cannot hold the head at the reproducing position after shifting operation due to mis-operation of a device for holding the head there. This does not mean, however, that the mechanism is out of order and cannot actuate any more. It simply means that the mechanism mis-operated once or twice. The mechanism according to the invention initiates a reproducing operation within a relatively short time.

We claim:

1. A head shift mechanism in a tape player which comprises:
    a solenoid means which moves a head provided in said tape player;
    solenoid driving signal generating means which supplies said solenoid means with a driving signal to drive it;
    source voltage detecting means which detects a source voltage to the tape player and generates detection signals to actuate said solenoid driving signal generating means;
    head shift interrupting means which interrupts a head shifting motion of said solenoid means when said head reaches a predetermined position; and,
    counting means which counts the duration of said signals applied to said solenoid means and acuates said head shift interrupting means when a predetermined number of said driving signals are counted.

2. A mechanism of claim 1 further comprising a rotation signal generator which generates rotation signals in response to rotation of a reel base in said tape player, and a rotation stop detector which is supplied with said rotation signals and applies its detection signal to said solenoid driving signal generating means when said rotation signal is not supplied for a given time.

3. A head shift mechanism in a tape player which comprises:
    a solenoid means which moves a head provided in said tape player;
    solenoid driving signal generating means which supplies said solenoid means with a driving signal to drive it;
    source voltage detecting means which detects a source voltage to the tape player and generates detection signals to actuate said solenoid driving signal generating means; and,
    head shift interrupting means which interrupts a head shifting motion of said solenoid means when said head reaches a predetermined position,
    said head shift interrupting means including a head position detecting switch provided between said source voltage detecting means and said solenoid driving signal generating means and adapted to be turned off when the head is not located at said predetermined position so as to interrupt said driving signal to said solenoid driving signal generating means therethrough.

* * * * *